United States Patent
Takeo et al.

(10) Patent No.: US 7,231,071 B2
(45) Date of Patent: Jun. 12, 2007

(54) ABNORMAL SHADOW DETECTING SYSTEM

(75) Inventors: Hideya Takeo, Kaisei-machi (JP); Takashi Imamura, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 461 days.

(21) Appl. No.: 10/241,670

(22) Filed: Sep. 12, 2002

(65) Prior Publication Data

US 2003/0081822 A1    May 1, 2003

(30) Foreign Application Priority Data

Sep. 13, 2001  (JP) .............................. 2001-277484
Sep. 26, 2001  (JP) .............................. 2001-292802

(51) Int. Cl.
G06K 9/00      (2006.01)
A61B 6/04      (2006.01)
G01B 15/02     (2006.01)
G01N 23/223    (2006.01)
G01N 23/04     (2006.01)
G01N 23/201    (2006.01)
G01T 1/36      (2006.01)

(52) U.S. Cl. ..................... 382/128; 382/131; 382/132; 378/37; 378/50; 378/62; 378/82; 378/87

(58) Field of Classification Search ........ 382/128–132; 378/37, 46–50, 62, 82–90
See application file for complete search history.

(56) References Cited

U.S. PATENT DOCUMENTS 5,365,429 A * 11/1994 Carman ........................ 378/37
5,586,160 A * 12/1996 Mascio ........................ 378/37
5,627,907 A *  5/1997 Gur et al. .................... 382/132
5,761,334 A    6/1998 Nakajima et al.
6,137,898 A * 10/2000 Broussard et al. .......... 382/132
6,137,923 A * 10/2000 Takeo et al. ................ 382/308
6,205,236 B1 * 3/2001 Rogers et al. .............. 382/132
6,272,233 B1 * 8/2001 Takeo ........................ 382/128
6,738,499 B1 * 5/2004 Doi et al. .................... 382/128

FOREIGN PATENT DOCUMENTS

JP    8-287230    11/1996
JP    8-298479    11/1996

OTHER PUBLICATIONS

Jin et al, Journal of Academy of Electronics/Information/Communication D-II, vol. J75-D-II, No. 7 pp. 1170-1176, Jul. 1992.
Hidefumi Kobatake, Medical Imaging Technology, vol. 12, No. 1, Jan. 1994.

* cited by examiner

Primary Examiner—Bhavesh M Mehta
Assistant Examiner—Manav Seth
(74) Attorney, Agent, or Firm—Sughrue Mion, PLLC

(57) ABSTRACT

In an abnormal shadow detecting system, a characteristic value on the shape and/or the density of a prospective area of a micro calcification shadow set in an image of an object is extracted on the basis of image data representing the image of the object, and whether a micro calcification shadow really exists in the prospective area is determined on the basis of the calculated characteristic value.

12 Claims, 10 Drawing Sheets

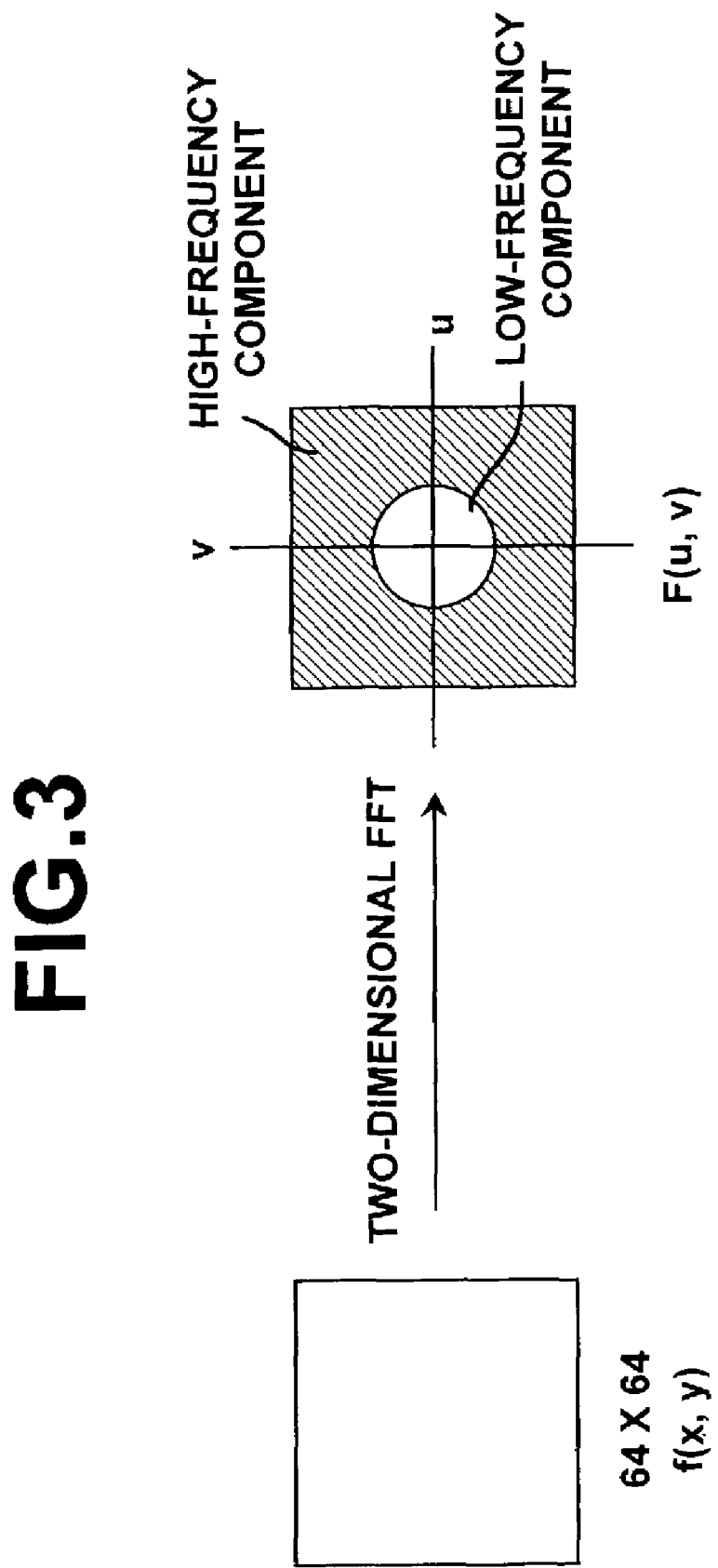

CENTER OF GRAVITY

ABNORMAL SHADOW DETECTING SYSTEM

BACKGROUND OF THE INVENTION

1. Field of the Invention

This invention relates to a system for detecting an abnormal shadow in a radiation image, and more particularly to a system for detecting a micro calcification shadow on the basis of image data representing a radiation image of an object.

2. Description of the Related Art

In the medical field, to find a diseased part of a patient or to observe a diseased part of a patient and diagnose progress of disease by reading a radiation image of the object (patient) has been a common operation. However, radiation image reading often depends upon experience and abilities of the reader and is not necessarily objective.

For example, it is necessary to find an abnormal shadow representing a growth and/or a micro calcification representative of a cancerous part in a mammogram (a radiation image of a breast) taken for the purpose of a breast cancer examination. However, depending on the reader, the abnormal shadow range cannot be properly detected. Accordingly, there has been a demand to properly detect an abnormal shadow including shadows of a growth and a micro calcification.

In order to meet this demand, there have been proposed abnormal shadow detecting systems (computer-aided image diagnosis systems), for instance, in Japanese Unexamined Patent Publication Nos. 8(1996)-294479 and 8(1996)-287230, in which an abnormal shadow is automatically detected by the use of a computer on the basis of image data representing a radiation image of the object. In the abnormal shadow detecting system, an abnormal shadow is automatically detected by the use of an iris filter processing which is mainly suitable for detecting a growth shadow and/or a morphology filter which is mainly suitable for detecting a micro calcification shadow.

The morphology filter processing will be briefly described hereinbelow. A morphology filter is a filter for removing or extracting from an image noises and/or shadows smaller than a structural element of a predetermined size, and is employed to smoothen image signals or to extract a micro calcification shadow representative of a cancerous part. The morphology filter processing is a method for detecting a micro calcification shadow representative of breast cancer through comparison of the output value of a morphology operation using a structural element larger than a micro calcification shadow (a discrete micro calcification shadow like a small point) to be detected with a predetermined threshold value.

(The Fundamentals of Morphology Operation)

Though the morphology operation is generally developed as a set theory in a N-dimensional space, it will be discussed here on the basis of a two-dimensional tone image for the purpose of simplicity of understanding.

It is assumed that a tone image is a space in which a point (x, y) has a height corresponding to a value of density f(x, y). Further it is assumed that the value of density f(x, y) is represented by a high brightness, high level signal in which as the value of density decreases (the value of brightness increases when displayed on a CRT), the level of the signal becomes higher.

For the purpose of simplicity, a linear function f(x) corresponding to a cross-section of the image is first discussed. It is assumed that a structural element $g$ employed in the morphology operation is a function which is represented by the following formula (1), is symmetrical about the origin, and is 0 in value in a domain represented by the following formula (2).

$$g^s(x) = g(-x) \tag{1}$$

$$G = \{-m, -m+1, \ldots, -1, 0, 1, \ldots, m-1, m\} \tag{2}$$

At this time, the fundamental form of the morphology operation is very simple as shown in the following formulae (3) to (6).

$$\text{dilation: } [f \oplus G^s](i) = \max\{f(i-m), \ldots, f(i), \ldots, f(i+m)\} \tag{3}$$

$$\text{erosion: } [f \oplus G^s](i) = \min\{f(i-m), \ldots, f(i), \ldots, f(i+m)\} \tag{4}$$

$$\text{opening: } f_g = (f \ominus g^s) \oplus g \tag{5}$$

$$\text{closing: } f^g = (f \oplus g^s) \ominus g \tag{6}$$

That is, the dilation processing is processing for searching a maximum value in the area whose width is ±m (a value determined according to the structural element B) and whose center is at the pixel of current interest, see FIG. 7A, and the erosion processing is processing for searching a minimum value in the same area, see FIG. 7B. The opening processing corresponds to searching a maximum value after searching a minimum value, and the closing processing corresponds to searching a minimum value after searching a maximum value. In other words, the opening processing smoothens the density curve f(x) from the low brightness side by removing protrusions in density (the portions which are higher in brightness than the surroundings) which are narrower than the mask size 2 m (see FIG. 7C), whereas the closing processing smoothens the density curve f(x) from the high brightness side by removing recesses in density (the portions which are lower in brightness than the surroundings) which are narrower than the mask size 2 m (see FIG. 7D).

In the case of a high density, high level signal in which as the value of density increases, the level of the signal becomes higher, the value of image signal for the value of density f(x) is reverse to that of a high brightness, high level signal. Accordingly, the dilation processing for a high density, high level signal corresponds to the erosion processing (FIG. 7B) for a high brightness, high level signal. Similarly, the erosion processing for a high density, high level signal corresponds to the dilation processing (FIG. 7A) for a high brightness, high level signal, the opening processing for a high density, high level signal corresponds to the closing processing (FIG. 7D) for a high brightness, high level signal, and the closing processing for a high density, high level signal corresponds to the opening processing for a high brightness, high level signal (FIG. 7C). Description will be made only on the high brightness, high level signal here unless otherwise mentioned.

(Application to Detection of a Micro Calcification Shadow)

As a method of detecting a calcification shadow, a subtraction method in which a smoothened image is subtracted from an original image is conceivable. Since it is difficult to distinguish a calcification shadow from an elongated non-calcification shadow (e.g., of a mammary gland, a blood vessel, and a mammary gland supporting tissue) by a simple smoothening method, there has been proposed morphology operation processing based on opening operation using multiple structural elements as represented by the following formula (7). See "Extraction of Microcalcifications on Mammogram Using Morphological Filter with Multiple Structuring Elements" (Journal of Academy of Electronics/Information/Communication D-II, vol. J75-D-II No. 7, pp. 1170 to 1176, July 1992) and "Basic Theory of Mathematical Morphology and its Application to Mammograms Processing" (MEDICAL IMAGING TECHNOLOGY, Vol. 12, No.1 January 1994)

$$P = f - \max_{i \in (1,...,M)} \{(f \ominus Bi) \oplus Bi\} \quad (7)$$
$$= f - \max_{i \in (1,...,M)} \{f_{Bi}\}$$

wherein Bi (i stands for 1, 2, 3 and 4) are four linear structural elements Bi shown in FIG. 8. When the structural elements Bi are larger than the micro calcification shadow to be detected, calcification shadows which are signal protrusions narrower than the structural elements Bi (a part of image the image signal of which fluctuates in a range spatially narrower than the structural elements B) are removed by opening processing. On the other hand, an elongated non-calcification shadow is left there as it is after the opening processing (calculation of the second term in formula 14) so long as it is longer than the structural elements Bi and its inclination (the direction in which the shadow extends) conforms to any one of the four structural elements Bi. Accordingly, by subtracting the smoothened image (the image removed with the calcification shadow) obtained by the opening processing from the original image f, a micro-structural image P containing therein only a small calcification shadow is obtained. This the concept of formula (7).

In the case of a high density, high level signal, closing processing is applied according to the following formula (8) in place of opening processing.

$$P = f - \min_{i \in (1,...,M)} \{(f \oplus Bi) \ominus Bi\} \quad (8)$$
$$= f - \min_{i \in (1,...,M)} \{f_{Bi}\}$$

However, a non-calcification shadow equivalent to a calcification shadow in size can partly remain. In such a case, non-calcification shadows contained in the micro-structural image P obtained from formula (7) are further removed by the use of differential information based on a morphology operation according to the following formula (9).

$$M_{grad} = (1/2) \times \{f \oplus \lambda B - f \ominus \lambda B\} \quad (9)$$

As the value of $M_{grad}$ increases, the probability that the shadow is of a calcification increases. Accordingly, a prospective calcification image $C_s$ (an image formed by extracted prospective points of micro calcification) can be obtained according to the following formula (10).

If $P(i, j) \geq T1$, and $M_{grad}(i, j) \geq T2$

Then, $C_s(i, j) = P$ else $C_s(i, j) = 0$ \quad (10)

T1 and T2 are empirically determined threshold values.

Since a non-calcification shadow different from a calcification shadow in size can be removed only by comparison of the micro-structural image P obtained according to formula (7) and the threshold value T1, only the condition of the first term of formula (10), $P(i, j) > T1$ has to be satisfied in the case where there is no possibility that a non-calcification shadow equivalent to a calcification shadow in size remains.

Finally, the cluster area Cc of the calcification shadow is detected by a combination of a multi-scale opening operation and closing operation represented by the following formula (11).

$$C_c = C_s \oplus \lambda_1 B \ominus \lambda_3 B \oplus \lambda_2 B \quad (11)$$

$\lambda_1$ and $\lambda_2$ are respectively determined by the maximum distance between calcification shadows to be fused and the maximum radius of an isolated shadow to be removed, and $\lambda_3 = \lambda_1 + \lambda_2$.

In the case of high density, high level signal, the relation between the opening operation and the closing operation in formulae (9) and (10) is reversed.

In the morphology filter processing, whether each extracted point is correctly of a micro calcification shadow or a point extracted wrong is determined on the basis of density. That is, an extracted point which is low in density (an isolated shadow) is regarded as noise or the like and omitted, whereas an area solely consisting of high-density extracted points is detected as a cluster area of the micro calcification shadow.

However, there still remain a possibility that noise or the like is included in high-density extracted points and that there is a non-calcification shadow in detected cluster areas.

Further, a low-density micro calcification shadow can be included in an isolated shadow. Such a low-density micro calcification shadow will be referred to as "isolated micro calcification shadow", herein below. In the conventional system where the extracted point is correctly of a micro calcification is determined on the basis of the density, it has been impossible to determine whether an isolated shadow is of noise or the like, or isolated micro calcification. Accordingly, it has been impossible to extract only isolated micro calcification shadows.

Further, conventionally, whether a micro calcification shadow really exists in a prospective area in an image of a breast detected by the morphology filter processing is determined on the basis of whether the number of the prospective points included in the prospective area is not smaller than 10% of the total number of the prospective points included in the overall image of the breast.

That is, since in a micro calcification shadow, fine calcic blocks irregular in shape are densely distributed, cluster areas in which the number of prospective points included therein is smaller than a predetermined threshold value (in proportion) are omitted.

Further, it has been known that micro calcification shadows in an image are irregular in size and density whereas noises are relatively regular in size and density.

SUMMARY OF THE INVENTION

In view of the foregoing observations and description, the primary object of the present invention is to provide an abnormal shadow detecting system in which a micro calcification shadow and noise or the like can be distinguished from each other without depending on the density of prospective points.

Another object of the present invention is to provide an abnormal shadow detecting system in which whether a micro calcification shadow really exists in a prospective area in an image of a breast can be determined more accurately on the basis of the proportion of the number of the prospective points included in the prospective area to the total number of the prospective points included in the overall image of the breast.

In accordance with a first aspect of the present invention, there is provided an abnormal shadow detecting system comprising a characteristic value calculating means which calculates a characteristic value on the shape and/or the density of a prospective area of a micro calcification shadow set in an image of an object on the basis of image data representing the image of the object, and a discriminating means which discriminates whether a micro calcification shadow really exists in the prospective area on the basis of the calculated characteristic value.

The term "prospective area of a micro calcification shadow" as used here means, for instance, a unit cluster area or a cluster area consisting of a plurality of unit cluster areas including therein one or more prospective points of micro calcification in a prospective calcification image made during a morphology filter processing. The term "unit cluster area" means an area for determining the density of the prospective points and may be, for instance, a circular area with a radius of 57 pixels or so in the case of 10 bit, 10 pixels/mm image data.

The prospective area of a micro calcification shadow need not be limited to a single unit cluster area or a plurality of unit cluster areas but may be broadly interpreted to mean any area including therein prospective points of micro calcification in an original image (an image of an object). The "prospective points of micro calcification in an original image" includes not only prospective points forming the prospective micro calcification image but also various shadows which can be a prospective point such as shadows of real micro calcification, noise and shadows of relatively high brightness included in the original image.

The term "the shape and/or the density of a prospective area of a micro calcification shadow" as used here means the density in the prospective area, the shape and/or density of the prospective points of micro calcification included in the prospective area of a micro calcification shadow, and the like. Further, the "characteristic value on the shape and/or the density of a prospective area of a micro calcification shadow" may comprise, for instance, at least one of the following nine (1~9) values.

(1) A threshold value (first threshold value) at the time at which the number of prospective points of micro calcification extracted from the prospective area in an original image (or a micro-structural image made in morphology filter processing) reaches a predetermined number (e.g., 5) as the threshold value is gradually reduced (gradually increased in the case of high density, high level image data). The prospective points are counted irrespective of whether they are real micro calcification.

(2) The difference between the first threshold value and a second threshold value (a threshold value at the time at which a first prospective point is extracted as the threshold value is gradually reduced). That is, the amount of reduction (amount of increase in the case of high density, high level image data) by which the threshold value is reduced from the time at which a first prospective point is extracted to the time at which the number of prospective points of micro calcification extracted reaches the predetermined number.

(3) The total volume of the predetermined number (e.g., 5) of prospective points extracted by the use of the first threshold value. That is, the total number of the pixels in sections of the predetermined number of prospective points extracted by the use of the first threshold value.

(4) The dispersion in size (the number of the pixels in the section of each of the predetermined number of prospective points extracted by the use of the first threshold value) of the predetermined number of prospective points extracted by the use of the first threshold value. The dispersion may be represented by any index of dispersion and may be, for instance, a variance or a standard deviation.

(5) The dispersion in density of the predetermined number of prospective points extracted by the use of the first threshold value. The dispersion may be represented by any index of dispersion and may be, for instance, a variance or a standard deviation.

(6) The sum-square of the high frequency component signals of the part of the image of the object after subjected to FFT corresponding to a central region of the prospective areas. The "central region" may be a region which is, for instance, 64×64 in mask size though need not be limited to this size. Preferably, the central region be $2''\times2''$ in mask size which is most compatible with the prospective area (inscribed in the prospective area). The "sum-square of the high frequency component signals after subjected to FFT" can be calculated, for instance, by defining the radius of an area of existence of low-frequency components over which the low-frequency components after subjected to FFT can exist and obtaining sum-square of signals of the surrounding area (hatched portion in FIG. 3) around the area of existence of low-frequency components.

(7) A first frequency at which one-dimensional response in the frequency space after the FFT in (6) becomes not larger than a predetermined value (e.g., 0.1) for the first time. The "one-dimensional response in the frequency space after subjected to the FFT" can be obtained as a profile such as shown in FIG. 4B, for instance, by rotating the by 360° about a one-dimensional line as shown in FIG. 4A. The characteristic value in (7) can be calculated by obtaining a first frequency at which the response (total of the projections of two-dimensional FFT signals) first becomes equal to or less than the predetermined value (e.g., 0.1) on the profile shown in FIG. 4B.

(8) The coefficient of variation of the dispersion in lengths in a plurality of directions of the prospective point at the center of the prospective area from its center of gravity. The "lengths in a plurality of directions of the prospective point from its center of gravity" means lengths from the center of gravity of the prospective point to the edge of the prospective point in a plurality of directions at substantially regular angular intervals (intervals of 45° in FIG. 5), for instance, as shown in FIG. 5, and the "coefficient of variation of the dispersion" is obtained by dividing the index of dispersion, e.g., a standard deviation, by the average of the lengths.

(9) The maximum length of the prospective point at the center of the prospective area. The "maximum length of the prospective point" means the largest dimension of the prospective point in terms of the number of pixels as shown in FIG. 6.

When obtaining the characteristics values shown in (1) to (5), (8) and (9), it is preferred that an original image be used though a micro-structural image may be used.

The discriminating means discriminates whether a micro calcification shadow really exists in the prospective area on the basis of at least one of such characteristic values. For example, the discriminating means determines that a micro calcification shadow really exists in the prospective area in the following case, assuming that the image signal is a high brightness, high level signal of 10 bits.
(1) In the case where the threshold value (the first threshold value) at the time at which the number of prospective points of micro calcification extracted from the prospective area reaches 5 is not smaller than 600.
(2) In the case where the difference between the first threshold value and the second threshold value (a threshold value at the time at which a first prospective point is extracted) is not larger than 120.
(3) In the case where the total volume of the 5 prospective points extracted by the use of the first threshold value is not larger than 15,000.
(4) In the case where the dispersion in size of the 5 prospective points extracted by the use of the first threshold value is not larger than 400.
(5) In the case where the dispersion in density of the 5 prospective points extracted by the use of the first threshold value is not larger than 105.
(6) In the case where the sum-square of the high frequency component signals is in the range of 4.3 to 55.
(7) In the case where the first frequency is in the range of 1.0 to 3.1.
(8) In the case where the coefficient of variation of the standard deviation is not larger than 3.0.
(9) In the case where the maximum length of the prospective point at the center of the prospective area is not larger than 20 or not smaller than 40.

In the case where a combination of two or more of the characteristic values (1) to (9) is employed, preferably it is determined that no micro calcification shadow really exists in the prospective area when at least one of the characteristic values does not satisfy the aforesaid condition (the criterion for discriminating whether a micro calcification shadow really exists in the prospective area). The criterion for discriminating whether a micro calcification shadow really exists in the prospective area need not be limited to those described above but preferably changed according to characteristics in the density of the micro calcification shadow to be detected (whether the micro calcification to be detected is common micro calcification, which is high in density or isolated micro calcification, which is low in density) and/or the combination and/or the number of characteristic values to be employed.

It is possible to arrange the discriminating means to discriminate whether a micro calcification shadow really exists in the prospective area on the basis of different criteria for discriminating between when the prospective area is of common micro calcification, which is high in density, and when the prospective area is of isolated micro calcification, which is low in density.

The criterion for discriminating for the common micro calcification may be those described above. The criterion for discriminating for the isolated micro calcification may be, for instance, as follows, assuming that the image signal is a high brightness, high level signal of 10 bits. That is, the discriminating means may determine that an isolated micro calcification shadow really exists in the prospective area in the following case, assuming that the image signal is a high brightness, high level signal of 10 bits.
(1) In the case where the threshold value (the first threshold value) at the time at which the number of prospective points of micro calcification extracted from the prospective area reaches 5 is in the range of 640 to 750.
(2) In the case where the difference between the first threshold value and the second threshold value (a threshold value at the time at which a first prospective point is extracted) is in the range of 1 to 3.
(3) In the case where the total volume of the 5 prospective points extracted by the use of the first threshold value is in the range of 2 to 10.
(4) In the case where the dispersion in size of the 5 prospective points extracted by the use of the first threshold value is not larger than 4.
(5) In the case where the dispersion in density of the 5 prospective points extracted by the use of the first threshold value is in the range of 0.4 to 1.0.
(6) In the case where the sum-square of the high frequency component signals is in the range of 5.7 to 7.0.
(7) In the case where the first frequency is in the range of 1.0 to 3.1.
(8) In the case where the coefficient of variation of the standard deviation is in the range of 0.4 to 1.2.
(9) In the case where the maximum length of the prospective point at the center of the prospective area is in the range of 3.6 to 4.5.

Instead of using different criteria for discriminating, different combinations of the characteristic values may be employed.

Further, the discriminating means may discriminate on the basis of the likelihood ratio based on Mahalanobis distances or by the use of a neural network.

As the image of an object, for instance, a radiation image of a breast may be employed.

In accordance with the abnormal shadow detecting system in accordance with the first aspect of the present invention arranged as described above, whether a prospective area set in an image of an object is real micro calcification shadow (whether a micro calcification shadow really exists in the prospective area) is determined on the basis of a characteristic value on the shape and/or the density of prospective points in the prospective area or on density inside the prospective area, whether the prospective area is real micro calcification shadow can be determined irrespective of the density of the prospective points, whereby micro calcification detecting performance can be improved.

That is, isolated micro calcification shadows can be detected out of isolated shadows which have been omitted, whereby the rate of detection can be improved. Further since areas mistaken for micro calcification, which are generated by noise or the like, can be taken out, the rate of wrong detection can be lowered, whereby micro calcification detecting performance can be improved.

When the discriminating means discriminates on the basis of the likelihood ratio based on Mahalanobis distances or by the use of a neural network, the characteristic values can be automatically weighted and more flexible discrimination can be expected. That is, when the system is arranged so that a prospective area is determined to be a real micro calcification only if all the 9 characteristic values satisfy the respective criteria, a prospective area in which 8 characteristic values out of 9 characteristic values satisfy the respective criteria is determined not to be a real micro calcification. When the discriminating means discriminates on the basis of the likelihood ratio based on Mahalanobis distances or by the use of a neural network, the characteristic values can be automatically weighted on the basis of balance of all the 9 characteristic values and determination can be more flexible.

In accordance with a second aspect of the present invention, there is provided an abnormal shadow detecting system comprising a prospective point extracting means which extracts a plurality of prospective points representing a prospective micro calcification shadow in an image of a breast on the basis of image data representing the image of the breast, a prospective area detecting means which detects a prospective micro calcification area including extracted prospective points on the basis of the image data, a corrected count calculating means which calculates a corrected count of each of the extracted prospective points for counting the number of the extracted prospective points differently weighting the extracted prospective points on the basis of dispersion in size and/or density of all the prospective points in a predetermined area including the extracted prospective point, and a discriminating means which calculates the proportion of the number of the prospective points included in a prospective area as counted on the corrected count of each prospective point to the number of the prospective points included in the overall image as counted on the corrected count of each prospective point and discriminates whether a micro calcification shadow really exists in the prospective area on the basis of the proportion.

The "prospective points representing a prospective micro calcification shadow" means points which are extracted on the basis of the size or the density and may be, for instance, those forming a prospective micro calcification image made by morphology filter processing.

The "prospective micro calcification area" may be, for instance, a cluster area made by morphology filter processing but need not be limited to that. For example, the prospective micro calcification area may be various areas detected on the basis of the size and/or density of the areas such as an area where the pixels are higher in brightness.

The corrected count for each prospective point may be larger as the dispersion in size and/or density of all the prospective points in a predetermined area including the prospective point increases, and smaller as the dispersion in size and/or density decreases with the discriminating means arranged to determine that a micro calcification shadow really exists in the prospective area when the proportion is not smaller than a predetermined value (e.g., 10% or 17%).

For example, the corrected count may be obtained by adding to the initial value of the count of each prospective point a count-correcting value for the prospective point determined on the basis of the dispersion in size of all the prospective points in a predetermined area including the prospective point. For example, the count-correcting value is set at −2 when the dispersion in size is smaller than a value 1 (a predetermined value), at −1 when the dispersion in size is between the value 1 and a value 2, at +1 when the dispersion in size is between a value 3 and a value 4, and at +2 when the dispersion in size is larger than the value 4. Otherwise, the count-correcting value may be set at −2 when the dispersion in density is smaller than a value 1' (a predetermined value), at −1 when the dispersion in density is between the value 1' and a value 2', at +1 when the dispersion in density is between a value 3' and a value 4', and at +2 when the dispersion in size is larger than the value 4'. Further, the initial value of the count of each prospective point may be corrected according to both the dispersion in size and the dispersion in density. This may be realized by adding to the initial value count-correcting values on the basis of the dispersion in size and the dispersion in density.

The "predetermined area including the extracted prospective point" may be, for instance, a circular area with a predetermined radius (e.g., a radius of 57 pixels in the case of 10 bits, 10 pixel/mm image data) and with its center on each prospective point. However, the predetermined area need not be limited to such an area but may be an area of various shapes and sizes so long as it includes the relevant prospective point. It is preferred that the predetermined area be set on the same standard (on the position, size and/or shape) for all the prospective points.

The dispersion may be represented by any index of dispersion and may be, for instance, a variance or a deviation.

In the abnormal shadow detecting system of the second aspect, since a corrected count of each of the extracted prospective points for counting the number of the extracted prospective points differently weighting the extracted prospective points is calculated on the basis of dispersion in size and/or density of all the prospective points in a predetermined area including the extracted prospective point, and whether a micro calcification shadow really exists in the prospective area is determined on the basis of the proportion of the number of the prospective points included in a prospective area as counted on the corrected count of each prospective point to the number of the prospective points included in the overall image as counted on the corrected count of each prospective point, the accuracy of discrimination can be higher than the conventional method where the proportion is calculated without weighting.

That is, it has been known that micro calcification shadows in an image are irregular in size and density as described above. Since the probability that the predetermined area is a micro calcification shadow is stronger when the dispersion in size and/or density of each prospective point and the prospective points therearound is large, the count-correcting value added to the initial value is made larger in such a case, whereas the count-correcting value is made smaller when the dispersion in size and/or density of each prospective point and the prospective points therearound is small.

BRIEF DESCRIPTION OF THE DRAWINGS

FIG. 3 is a view for illustrating the "sum-square of the high frequency component signals after subjected to FFT"

DESCRIPTION OF THE PREFERRED EMBODIMENTS

Figure 1:
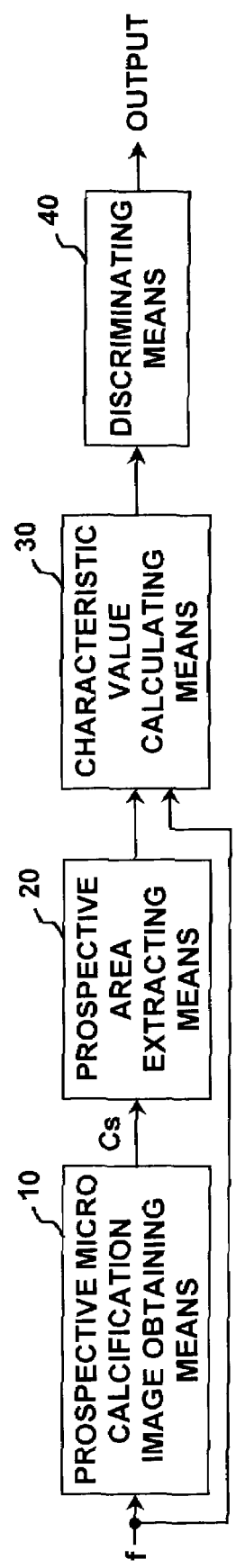
FIG. 1 is a schematic block diagram showing an abnormal shadow detecting system in accordance with a first embodiment of the present invention.

In FIG. 1, a prospective abnormal shadow detecting system of a first embodiment of the present invention comprises a prospective micro calcification image obtaining means 10 which makes prospective micro calcification image data Cs formed by prospective points extracted from an original image by the use of the morphology filter processing on the basis of original image data (object image data) input from, for instance, an image read-out apparatus, a prospective area extracting means 20 which sets circular areas (unit cluster areas) with a radius of 57 pixels about all the pixels in the original image and extracts those including therein not less than five prospective points as prospective areas of micro calcification out of the unit cluster areas on the basis of the prospective micro calcification image data Cs input from the prospective micro calcification image obtaining means 10, a characteristic value calculating means 30 which calculates a characteristic value on the shape and/or the density of the prospective area extracted by the prospective area extracting means 20, and a discriminating means 40 which discriminates whether a micro calcification shadow really exists in the prospective area on the basis of the characteristic value calculated by the characteristic value calculating means 30. In this particular embodiment, the characteristic value calculating means 30 calculates the following 9 characteristic values and the discriminating means 40 discriminates whether a micro calcification shadow really exists in the prospective area on the basis of the following 9 criteria for discriminating. These characteristic values and the criteria for discriminating are determined according to the shape and/or the density of micro calcification to be detected. In this particular embodiment, the image signal is a high brightness, high level signal of 10 bits at a pixel density of 10 pixel/mm.

(1) A threshold value (first threshold value) at the time at which the number of prospective points of micro calcification extracted from the prospective area reaches 5 as the threshold value is gradually reduced.

(2) The difference between the first threshold value and a second threshold value (a threshold value at the time at which a first prospective point is extracted as the threshold value is gradually reduced).

(3) The total volume of the 5 prospective points extracted by the use of the first threshold value (the total number of the pixels in sections of the predetermined number of prospective points extracted by the use of the first threshold value).

(4) The dispersion in size (the number of the pixels (as seen in the original image) in the section of each of the 5 prospective points extracted by the use of the first threshold value) of the predetermined number of prospective points extracted by the use of the first threshold value.

(5) The dispersion in density (as seen in the original image) of the 5 prospective points extracted by the use of the first threshold value.

(6) The sum-square of the high frequency component signals of the part of the image of the object after subjected to FFT corresponding to a central region (64×64 in mask size) of the prospective areas.

(7) A first frequency at which one-dimensional response in the frequency space after the FFT in (6) becomes not larger than 0.1 for the first time.

(8) The coefficient of variation of the standard deviation in lengths in 8 directions of the prospective point at the center of the prospective area from its center of gravity.

The "coefficient of variation of the standard deviation" is obtained by dividing the standard deviation by the average of the lengths.

(9) The maximum length of the prospective point at the center of the prospective area in terms of the number of.

The discriminating means 40 discriminates whether a micro calcification shadow really exists in the prospective area on the basis of the following 9 criteria for discriminating.

(1) In the case where the first threshold value is not smaller than 600.

(2) In the case where the difference between the first threshold value and the second threshold value is not larger than 120.

(3) In the case where the total volume of the 5 prospective points is not larger than 15,000.

(4) In the case where the dispersion in size of the 5 prospective is not larger than 400.

(5) In the case where the dispersion in density of the 5 prospective points is not larger than 105.

(6) In the case where the sum-square of the high frequency component signals is in the range of 4.3 to 55.

(7) In the case where the first frequency is in the range of 1.0 to 3.1.

(8) In the case where the coefficient of variation of the standard deviation is not larger than 3.0.

(9) In the case where the maximum length of the prospective point at the center of the prospective area is not larger than 20 or not smaller than 40.

In order to avoid counting one prospective point twice or more in the above (1), only a prospective point at a predetermined distance (e.g., 3 pixels) or more from another prospective point is counted among the prospective points. That is, when another prospective point is found at a distance within 3 pixels from a prospective point which has been extracted before, the "another" prospective point is not counted among the prospective points.

The difference between the first threshold value and the second threshold value in the above (2) is the amount of reduction by which the threshold value is reduced from the time at which a first prospective point is extracted to the time at which the number of prospective points of micro calcification extracted reaches 5.

The sum-square of the high frequency component signals in the above (6) is expressed as follows when the signals obtained by FFT of the original image data f(x, y) is represented by F(u, v), (x, y) representing a real space coordinates and (u, v) representing a frequency space coordinates.

$$\sum_u \sum_v [F(u, v)]^2$$

wherein only the high-frequency components (e.g., hatched portion in FIG. 3) are included in the range of integration in this formula.

Operation of the abnormal shadow detecting system of this embodiment will be described, hereinbelow.

When an original image data f is input into the prospective micro calcification image obtaining means 10 from an image read-out apparatus or the like, the prospective micro calcification image obtaining means 10 extracts prospective points of a micro calcification shadow by a morphology filter processing by the use of a predetermined threshold value and makes a prospective micro calcification image Cs. See formula (10).

The prospective micro calcification image Cs made by the prospective micro calcification image obtaining means 10 is input into the prospective area extracting means 20. The prospective area extracting means 20 sets unit cluster areas with a radius of 57 pixels about all the pixels in the original image and extracts those including therein not less than five prospective points as prospective micro calcification areas out of the unit cluster areas on the basis of the prospective micro calcification image data Cs. It is assumed that a plurality of prospective micro calcification areas (prospective areas of micro calcification).

When prospective micro calcification areas are extracted, the characteristic value calculating means 30 calculates the characteristic values (1) to (9) by prospective micro calcification areas on the basis of the original image data f and position information on the prospective micro calcification areas input into the characteristic value calculating means 30, and the characteristic values (1) to (9) calculated by the characteristic value calculating means 30 are input into the discriminating means 40 and the discriminating means 40 discriminates whether a micro calcification really exists in each of the prospective micro calcification areas (whether each of the prospective micro calcification areas is a real micro calcification shadow) on the basis of the aforesaid 9 criteria for discriminating. The discriminating means 40 determines that a prospective micro calcification areas is a real micro calcification shadow when the prospective micro calcification area satisfies all the 9 criteria and unites unit cluster areas determined to be a real micro calcification shadow into a cluster area, and then outputs the cluster area as the result of detection.

In accordance with the abnormal shadow detecting system of this embodiment, areas mistaken for micro calcification from the areas extracted as prospective micro calcification areas on the basis of object image data can be taken out, and accordingly the rate of wrong detection can be lowered.

Though, in the embodiment described above, unit cluster areas including therein not less than 5 prospective points are extracted as the prospective micro calcification areas, the system may be arranged so that cluster areas of a micro calcification shadow are made by morphology filter processing, the cluster areas made are taken as prospective micro calcification areas, the discrimination is made by the prospective micro calcification areas or by unit cluster areas forming each prospective micro calcification area, and the cluster areas are reconstructed by removing the prospective micro calcification areas or unit cluster areas which are determined not to be a real micro calcification shadow.

Figure 2:
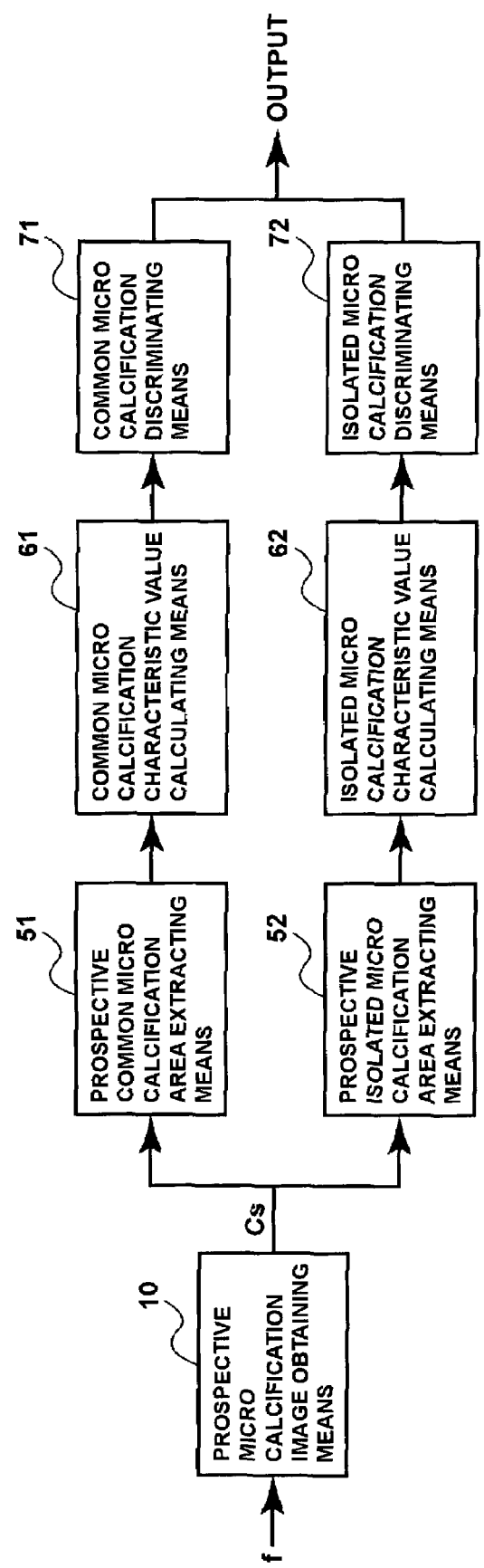
FIG. 2 is a schematic block diagram showing an abnormal shadow detecting system in accordance with a second embodiment of the present invention.
Figure 4B:
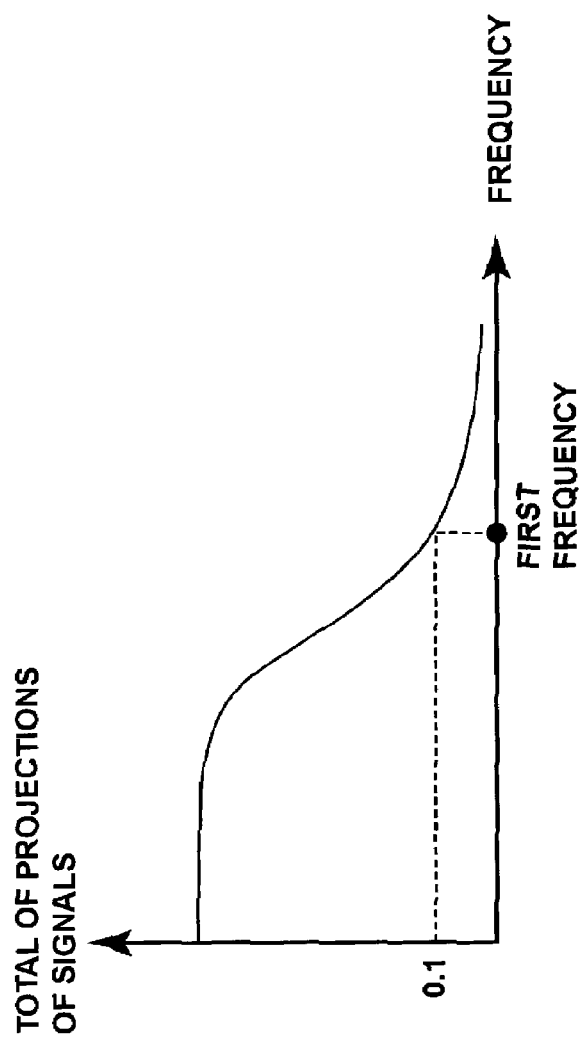
FIGS. 4A and 4B are views for illustrating the "one-dimensional response in the frequency space after subjected to the FFT"
Figure 4A:
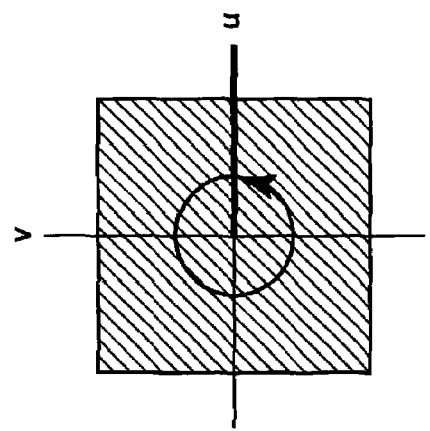
Figure 5:
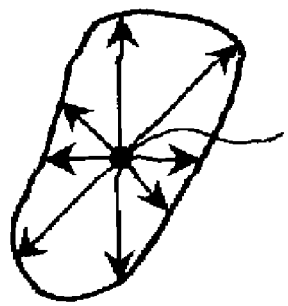
FIG. 5 is a view for illustrating the "lengths of the prospective point from its center of gravity in a plurality of directions"
Figure 6:
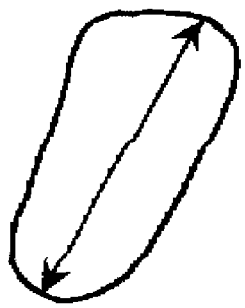
FIG. 6 is a view for illustrating the "maximum length of the prospective point"
Figure 7A:
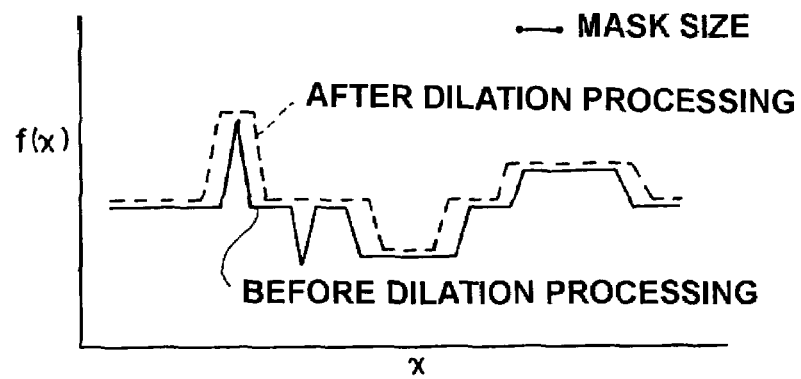
FIGS. 7A to 7D are views for illustrating basic operation of the morphology filter.
Figure 7B:
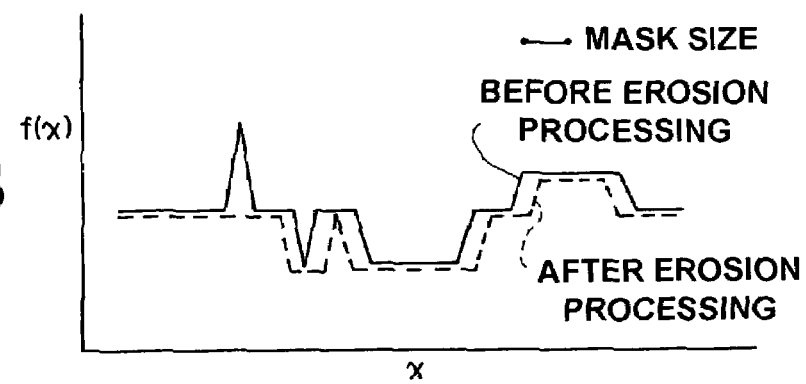
Figure 7C:
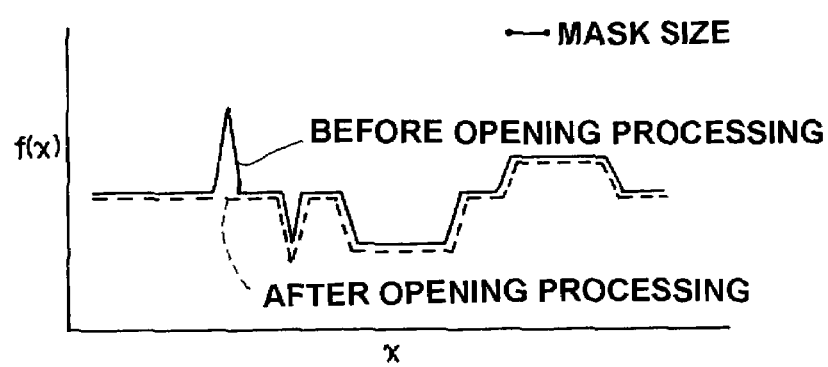
Figure 7D:
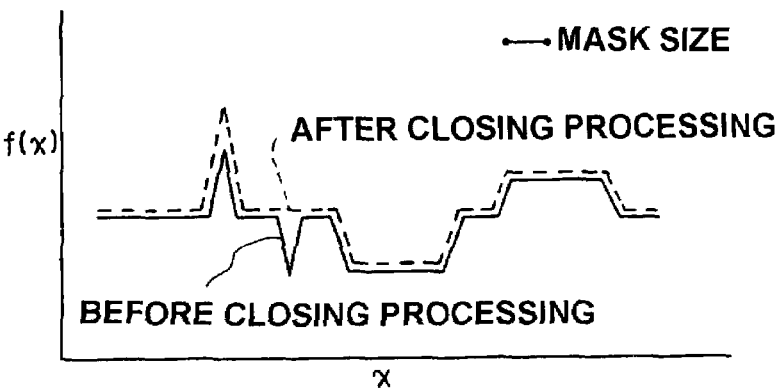
Figure 8:
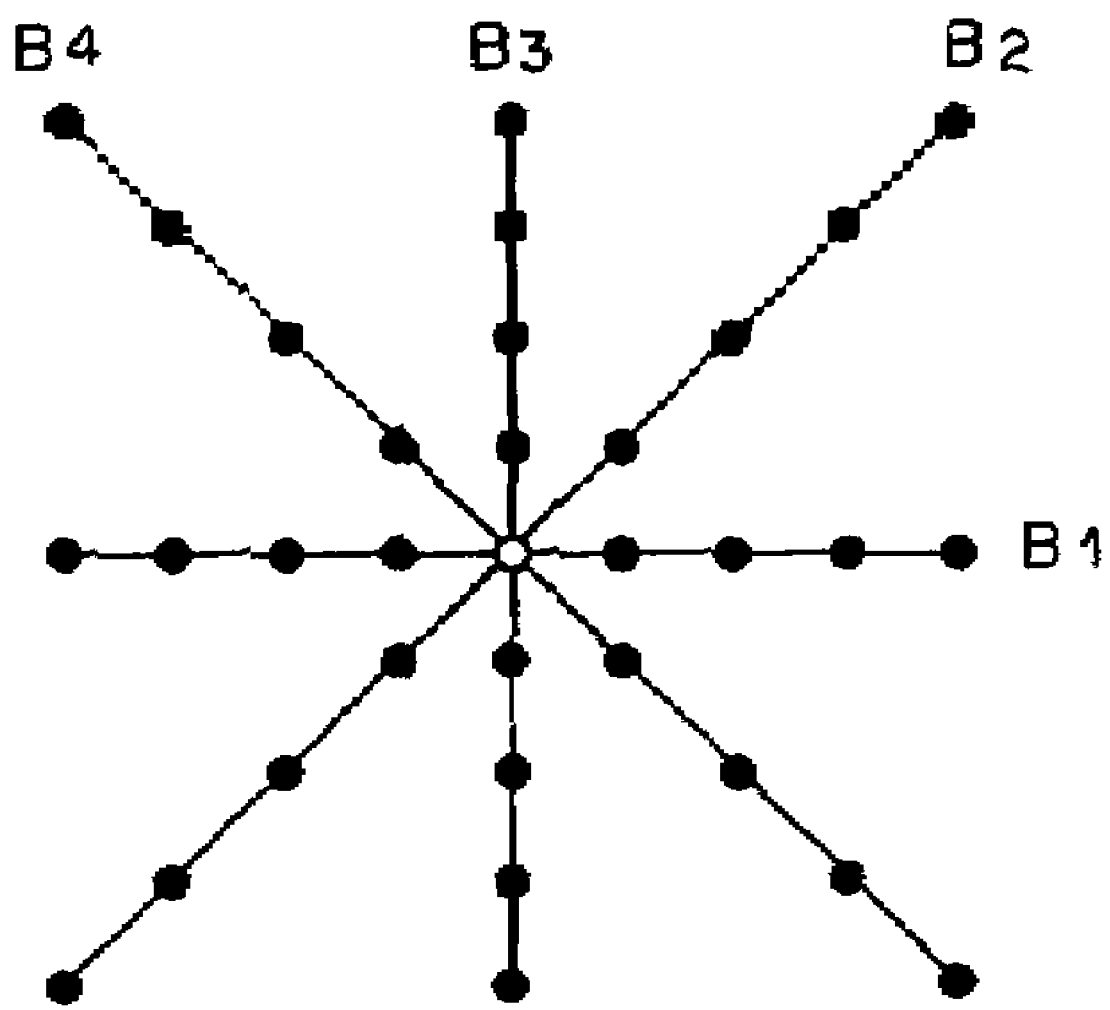
FIG. 8 is a view for illustrating four linear structural elements employed in the morphology filter processing.

An abnormal shadow detecting system in accordance with a second embodiment of the present invention will be described, hereinbelow, with reference to FIG. 2. In FIG. 2, elements analogous to those of the first embodiment shown in FIG. 1 are given the same reference numerals and will not be described here unless necessary.

The prospective abnormal shadow detecting system of the second embodiment of the present invention comprises a prospective micro calcification image obtaining means 10 which makes prospective micro calcification image data Cs formed by prospective points extracted from an original image by the use of the morphology filter processing on the basis of original image data (object image data) input from, for instance, an image read-out apparatus, a prospective common micro calcification area extracting means 51 which sets circular areas (unit cluster areas) with a radius of 57 pixels about all the pixels in the original image and extracts those including therein not less than five prospective points as prospective common micro calcification areas out of the unit cluster areas on the basis of the prospective micro calcification image data Cs input from the prospective micro calcification image obtaining means 10, a common micro calcification characteristic value calculating means 61 which calculates a characteristic value of the prospective common micro calcification area extracted by the prospective common micro calcification area extracting means 51, a common micro calcification discriminating means 71 which discriminates whether the prospective common micro calcification areas are real micro calcification shadows on the basis of the characteristic value calculated by the common micro calcification characteristic value calculating means 30, a prospective isolated micro calcification area extracting means 52 which sets circular areas (unit cluster areas) with a radius of 57 pixels about all the pixels in the original image and extracts those including therein not more than four prospective points as prospective isolated micro calcification areas out of the unit cluster areas on the basis of the prospective micro calcification image data Cs input from the prospective micro calcification image obtaining means 10, an isolated micro calcification characteristic value calculating means 62 which calculates a characteristic value of the prospective isolated micro calcification area extracted by the prospective isolated micro calcification area extracting means 52, an isolated micro calcification discriminating means 72 which discriminates whether the prospective isolated micro calcification areas are real micro calcification shadows on the basis of the characteristic value calculated by the isolated micro calcification characteristic value calculating means 30.

Since the prospective common micro calcification area extracting means 51, the common micro calcification characteristic value calculating means 61 and the common micro calcification discriminating means 71 are respectively equivalent to the prospective area extracting means 20, the characteristic value calculating means 30 and the discriminating means 40 in the first embodiment, and the isolated micro calcification characteristic value calculating means 62 is equivalent to the characteristic value calculating means 30 in the first embodiment, the prospective common micro calcification area extracting means 51, the common micro calcification characteristic value calculating means 61, the common micro calcification discriminating means 71 and the isolated micro calcification characteristic value calculating means 62 will not be described here.

The isolated micro calcification discriminating means 72 determines whether the prospective isolated micro calcification areas are real isolated micro calcification shadows in the following cases (will be referred to as "criteria for discriminating isolated micro calcification", hereinbelow), assuming that the image signal is a high brightness, high level signal of 10 bits at a pixel density of 10 pixel/mm.

(1) In the case where the threshold value (the first threshold value) at the time at which the number of prospective points of micro calcification extracted from the prospective area reaches 5 is in the range of 640 to 750.

(2) In the case where the difference between the first threshold value and the second threshold value (a threshold value at the time at which a first prospective point is extracted) is in the range of 1 to 3.

(3) In the case where the total volume of the 5 prospective points extracted by the use of the first threshold value is in the range of 2 to 10.

(4) In the case where the dispersion in size of the 5 prospective points extracted by the use of the first threshold value is not larger than 4.
(5) In the case where the dispersion in density of the 5 prospective points extracted by the use of the first threshold value is in the range of 0.4 to 1.0.
(6) In the case where the sum-square of the high frequency component signals is in the range of 5.7 to 7.0.
(7) In the case where the first frequency is in the range of 1.0 to 3.1.
(8) In the case where the coefficient of variation of the standard deviation is in the range of 0.4 to 1.2.
(9) In the case where the maximum length of the prospective point at the center of the prospective area is in the range of 3.6 to 4.5.

As described above, the first threshold value is a threshold value at the time at which the number of prospective points of micro calcification extracted from the prospective area reaches 5 as the threshold value is gradually reduced. When the number of prospective points of micro calcification extracted from the prospective area is not larger than 4 at a certain threshold value (a third threshold value) larger than the first threshold value, the threshold value is further reduced. When a fifth prospective point is extracted by reducing the threshold value, the threshold value at which the fifth prospective point is extracted is the first threshold value.

Operation of the abnormal shadow detecting system of this embodiment will be described, hereinbelow.

The prospective micro calcification image Cs made by the prospective micro calcification image obtaining means 10 is input into the prospective common micro calcification area extracting means 51 and the prospective isolated micro calcification area extracting means 52.

The prospective isolated micro calcification area extracting means 52 sets unit cluster areas with a radius of 57 pixels about all the pixels in the original image and extracts those including therein not more than four prospective points as prospective isolated micro calcification areas out of the unit cluster areas on the basis of the prospective micro calcification image data Cs.

When prospective isolated micro calcification areas are extracted by the prospective isolated micro calcification area extracting means 52, the isolated micro calcification characteristic value calculating means 62 calculates the characteristic values (1) to (9) on the basis of the original image data $f$ and position information on the prospective isolated micro calcification areas input into the isolated micro calcification characteristic value calculating means 62, and the characteristic values (1) to (9) calculated by the isolated micro calcification characteristic value calculating means 62 are input into the isolated micro calcification discriminating means 72 and the isolated micro calcification discriminating means 72 discriminates whether each of the prospective isolated micro calcification areas is a real isolated micro calcification shadow on the basis of the aforesaid 9 criteria for discriminating isolated micro calcification. The isolated micro calcification discriminating means 72 determines that a prospective isolated micro calcification areas is a real isolated micro calcification shadow when the prospective isolated micro calcification area satisfies all the 9 criteria for discriminating isolated micro calcification. The unit cluster areas determined to be a real micro calcification shadow by the common micro calcification discriminating means 71 and the isolated micro calcification discriminating means 72 into a cluster area, and the cluster area is output as the result of detection. The cluster area representing the isolated micro calcification shadow and the cluster area representing the common micro calcification shadow may be separately made and output as the result of detection.

In accordance with the abnormal shadow detecting system of this embodiment, isolated micro calcification shadows can be detected, and accordingly the micro calcification shadow detecting rate can be improved.

Though the abnormal shadow detecting system of the second embodiment comprises both the common micro calcification characteristic value calculating means 61 and the isolated micro calcification characteristic value calculating means 62, a single characteristic value calculating means may be used so long as the common micro calcification characteristic value calculating means 61 and the isolated micro calcification characteristic value calculating means 62 calculate the same characteristic value. In this case, the prospective common micro calcification area extracting means 51 and the prospective isolated micro calcification area extracting means 52 input position information on the respective prospective areas together with information on density properties of the respective prospective areas into the single characteristic value calculating means and the single characteristic value calculating means inputs characteristic values of the prospective common micro calcification areas and position information thereon into the common micro calcification discriminating means 71 and characteristic values of the prospective isolated micro calcification areas and position information thereon into the isolated micro calcification discriminating means 72 referring to the information on density properties.

Though, in the second embodiment described above, the common micro calcification characteristic value calculating means 61 and the isolated micro calcification characteristic value calculating means 62 calculate the same characteristic value, they may calculate different kinds of characteristic values.

The method of extracting prospective areas need not be limited to those described above in the embodiments but may be various methods. For example, the prospective areas may be extracted according to the brightness in the original image. Further, the abnormal shadow detecting system of this invention need not be provided with a means for extracting the prospective areas. For example, the abnormal shadow detecting system of this invention may be arranged so that position information on the position of prospective micro calcification areas is input from an external apparatus or the like, and the characteristic value of the prospective micro calcification areas is calculated on the basis of the position information and the original image data $f$ input into the abnormal shadow detecting system.

The common micro calcification shadows and the isolated micro calcification shadows can be separately detected by various methods other than that employed in the second embodiment, where prospective common micro calcification areas and prospective isolated micro calcification areas are separately extracted. For example, prospective micro calcification areas may be extracted together (i.e., without separating the prospective common micro calcification areas and the prospective isolated micro calcification areas) and the common micro calcification areas and the isolated micro calcification areas may be separated, from each other and from other areas detected wrong, on the basis of respective criteria for discriminating.

Though, in the embodiments described above, only the prospective area which satisfies all the 9 criteria based on the aforesaid 9 characteristic values are determined to be a real micro calcification shadow, whether a prospective area is a real micro calcification shadow may be determined on the basis of the aforesaid 9 characteristic values by the use of Mahalanobis distance.

That is, the Mahalanobis distance Dm1 of the prospective areas from a pattern class (i=1) representing a non-calcification shadow which has been empirically determined and the Mahalanobis distance Dm2 of the prospective areas from a pattern class (i=2) representing a common micro calcification shadow which has been empirically determined are first calculated according to the following formula.

$$Dmi = \left(\vec{x} - \vec{mi}\right)^t \sum_i^{-1} \left(\vec{x} - \vec{mi}\right)$$

wherein $$\sum_i$$

represents a covariance matrix of a pattern class wi, that is, $$\sum_i = (1/Ni) \sum_{x \in wi} \left(\vec{x} - \vec{mi}\right)\left(\vec{x} - \vec{mi}\right)^t$$

wherein t represents a transposed vector (a transverse vector), $$\vec{x}$$

represents a characteristic value x in vector (that is, $$\vec{x} = (x1, x2, \ldots, xN),$$

$$\sum_i^{-1}$$

represents an inverse matrix of $$\sum_i$$

and $$\vec{mi}$$

represents the average of the pattern class wi (that is, $$\vec{mi} = (1/Ni) \sum_{x \in wi} \vec{x}\right).$$

The aforesaid 9 characteristic values respectively correspond to x1 to x9 and express a nine-dimensional space (x1, x2, x3, ..., x9). The Mahalanobis distance between the prospective area pattern as expressed on the nine-dimensional pattern space and a non-calcification shadow pattern as expressed on the nine-dimensional pattern space is Dm1, the Mahalanobis distance between the prospective area pattern as expressed on the nine-dimensional pattern space and a common micro calcification shadow pattern as expressed on the nine-dimensional pattern space is Dm2.

The non-calcification shadow pattern and the common micro calcification shadow pattern are pattern spaces defined by vector x which have been set respectively for non-calcification shadows and common micro calcification shadows on the basis of the result of investigation on a lot of prospective abnormal shadows. For example, the pattern class w1 of non-calcification shadows is defined by the average of the vectors x of non-calcification shadows, and the pattern class w2 of common micro calcification shadows is defined by the average of the vectors x of common micro calcification shadows.

For example, when the prospective area is a common micro calcification shadow, there is a tendency for the Mahalanobis distance from the pattern class of the common micro calcification to be short (Dm2 is small) and for the Mahalanobis distance from the pattern class of the non-calcification shadow to fluctuate. To the contrast, when the prospective area is a non-calcification shadow, there is a tendency for the Mahalanobis distance from the pattern class of the non-calcification shadow to be short (Dm1 is small) and for the Mahalanobis distance from the pattern class of the non-calcification shadow to fluctuate A likelihood ratio (Dm1/Dm2) for distinguishing the common micro calcification shadow from the non-calcification shadow according to these tendencies is calculated for each of the prospective areas.

Figure 9:
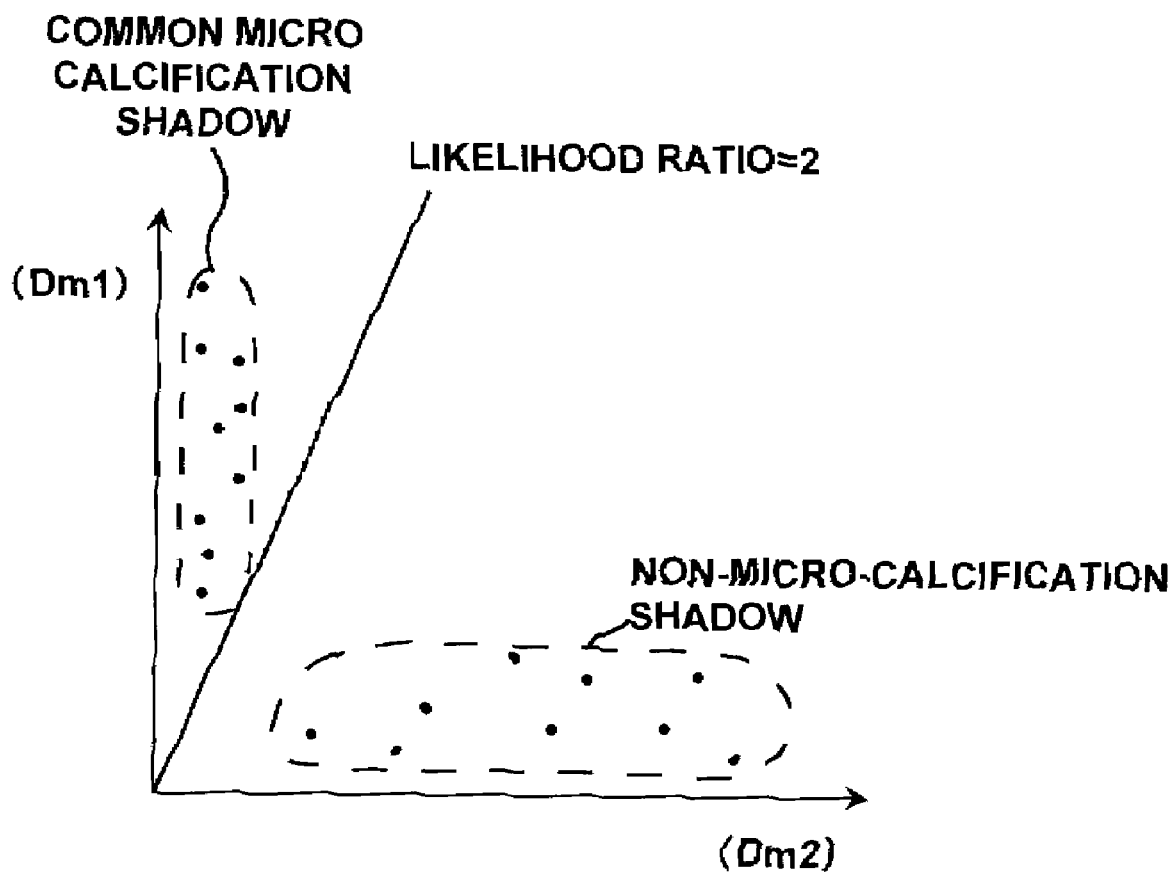
FIG. 9 is a view for illustrating a method of discrimination based on the Mahalanobis distance.

The first likelihood ratio is defined by DM1/DM2 and represents the inclination of the straight line shown in FIG. 9. That is, as the likelihood ratio is larger, the probability that the prospective area is a common micro calcification shadow is stronger and as the likelihood ratio is smaller, the probability that the prospective area is a non-calcification shadow is stronger. For instance, it is determined that the prospective area is a common micro calcification shadow when the likelihood ratio is not smaller than 2, and that the prospective area is a non-calcification shadow when the likelihood ratio is smaller than 2.

The isolated micro calcification shadow can be discriminated by the use of the Mahalanobis distance in the similar manner.

Further, it is possible to arrange the discriminating means to discriminate whether the prospective area is a real micro calcification shadow on the basis of the aforesaid 9 characteristic values by the use of a neural network.

A combination of two or more of the aforesaid characteristic values (1) to (9) may be employed to discriminate the prospective areas.

Figure 10:
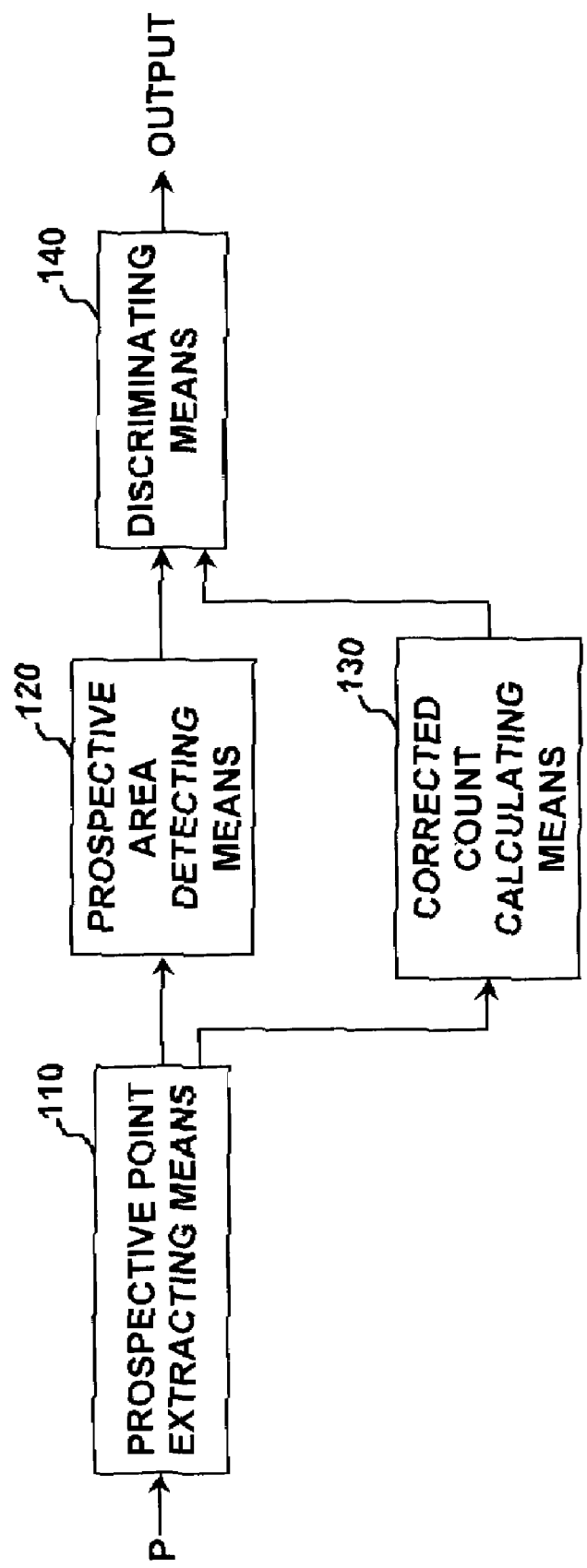
FIG. 10 is a schematic block diagram showing an abnormal shadow detecting system in accordance with a third embodiment of the present invention.

An abnormal shadow detecting system in accordance with a third embodiment of the present invention will be described with reference to FIGS. 10 and 11, hereinbelow.

An abnormal shadow detecting system in accordance with a third embodiment of the present invention comprises a prospective point extracting means 110 which extracts a plurality of prospective points representing a prospective micro calcification shadow in an original image on the basis of original image data P input, for instance, from an image read-out apparatus, a prospective area detecting means 120 which clusters prospective points extracted by the prospective point extracting means 110 into a prospective micro calcification area including extracted prospective points, a corrected count calculating means 130 which calculates a corrected count of each of the extracted prospective points for counting the number of the extracted prospective points, and a discriminating means 140 which receives information on the position of the prospective micro calcification area from the prospective area detecting means 120 and the corrected count for each of the prospective points from the corrected count calculating means 130 and calculates the proportion of the number of the prospective points included in a prospective area as counted on the corrected count of each prospective point to the number of the prospective points included in the overall image as counted on the corrected count of each prospective point and discriminates whether a micro calcification shadow really exists in the prospective area on the basis of the proportion. When a plurality of prospective micro calcification areas are detected, the discriminating means 140 discriminates whether a micro calcification shadow really exists in the prospective area for each of the prospective micro calcification areas.

Operation of the abnormal shadow detecting system of this embodiment will be described, hereinbelow.

When an original data P representing a radiation image of a breast is input into the prospective point extracting means 110, the prospective point extracting means 110 extracts prospective micro calcification points by morphology filter processing and creates prospective micro calcification image data Cs. At this time, the first and second threshold values T1 and T2 are set small (formula (10)) so that noises and/or thin micro calcification shadows are included in the prospective micro calcification image data Cs.

The prospective area detecting means 120 sets a circular area with a radius of 57 pixels (5.7 mm) and with its center on each prospective point on the basis of the prospective micro calcification image data Cs and counts the number of prospective points included in each of the circular areas. Then the prospective area detecting means 120 calculates deviation in size and deviation in density of all the prospective points included in each of the circular areas, and corrects the count for each of the circular areas on the basis of the deviations.

Figure 11:
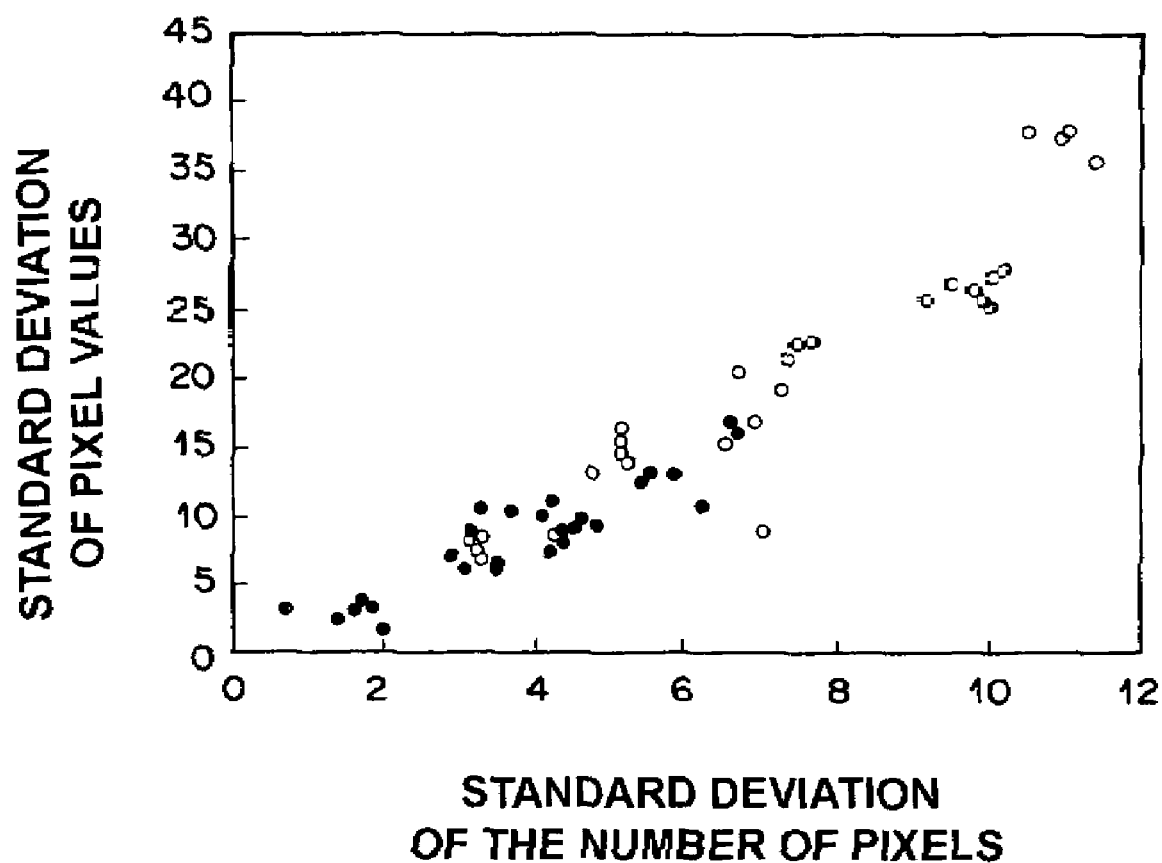
FIG. 11 is a view showing the dispersion in size (the standard deviation of the number of the pixels) and the dispersion in density (the standard deviation of the pixel values) of prospective micro calcification points included in the circular area.

FIG. 11 is a view showing the dispersion in size (abscissa) and the dispersion in density (ordinate) of prospective micro calcification points included in the circular areas. That is, the dispersion in size of the prospective micro calcification points is represented in terms of the standard deviation of the number of the pixels as represented by 10 pixel/mm image data, whereas the dispersion in density is represented in terms of the standard deviation of the pixel values (the values of 10 bit signals for the pixels) when the image data is a high density, high level signal. As can be seen from FIG. 11, non-calcification shadows (noises and the like) represented by black dots concentrate on a lower left part where deviations in density and size are both smaller whereas micro calcification shadows represented by white dots concentrate on an upper right part where deviations in density and size are both larger. The prospective are a detecting means 120 corrects the count for each of the circular areas on the basis of this tendency.

For example, the prospective area detecting means 120 sets a count-correcting value is at −2 when the deviation in size of the prospective points in the circular areas is not smaller than 0.0 and smaller 0.7, at −1 when the deviation in size of the prospective points in the circular areas is not smaller than 0.7 and smaller 2.0, at +1 when the deviation in size of the prospective points in the circular areas is not smaller than 6.7 and smaller 20.0, and at +2 when the deviation in size of the prospective points in the circular areas is not smaller than 20.0. Further, the prospective area detecting means 120 sets a count-correcting value is at −2 when the deviation in density of the prospective points in the circular areas is not smaller than 0.0 and smaller 1.3, at −1 when the deviation in density of the prospective points in the circular areas is not smaller than 1.3 and smaller 4.0, at +1 when the deviation in density of the prospective points in the circular areas is not smaller than 26.7 and smaller 80.0, and at +2 when the deviation in density of the prospective points in the circular areas is not smaller than 80.0. That is, the prospective area detecting means 120 adds to the count of each prospective area a count-correcting value between −4 and +4 according to the deviations in size and density.

The prospective area extracting means 120 extracts circular areas which are not smaller than 5 in the corrected count as the prospective area. When two or more contiguous circular areas are extracted, these areas are united to one prospective area.

The corrected count calculating means 130 sets a circular area with a radius of 57 pixels (5.7 mm) and with its center on each prospective point on the basis of the prospective micro calcification image data Cs and counts the number of prospective points included in each of the circular areas. Then the corrected count calculating means 130 calculates deviation in size and deviation in density of all the prospective points included in each of the circular areas, and calculates a corrected count of the prospective point at the center of each circular area on the basis of the deviations. The corrected count is obtained by weighting the count of each prospective point (1 in initial value) on the basis of the properties in shape and density of the micro calcification shadow.

Specifically, the corrected count calculating means 130 corrects the count of the prospective point at the center of each circular area by the use of count-correcting values which are the same as those for correcting the count for each of the circular areas. That is, the corrected count calculating means 130 obtains corrected count of the prospective point at the center of each circular area by adding a count-correcting value between −4 and +4 according to the deviations in size and density to the initial value 1 of the count of the prospective point.

The discriminating means 140 receives information on the position of each prospective point from the prospective area detecting means 120 and the corrected count of each prospective point from the corrected count calculating means 130 and calculates the number A of the prospective points included in the overall image as counted on the corrected count of each prospective point and the number B of the prospective points included in a prospective area as counted on the corrected count of each prospective point, and discriminates whether the micro calcification shadow really exists in the prospective area on the basis of the proportion of the latter number to the former number B/A. That is, when the proportion B/A is larger than 17%, the discriminating means 140 determines that the prospective micro calcification area is a real micro calcification shadow. When there are a plurality of prospective areas, the discriminating means 140 calculates the proportion B/A for each prospective area and makes the same discrimination for each prospective area on the basis of the proportion B/A. The threshold value 17% may be empirically changed.

In the abnormal shadow detecting system of the this embodiment, since a corrected count of each of the extracted prospective points for counting the number of the extracted prospective points differently weighting the extracted prospective points is calculated on the basis of deviation in size and/or density of all the prospective points in a predetermined area, and whether a micro calcification shadow really exists in the prospective area is determined on the basis of the proportion of the number of the prospective points included in a prospective area as counted on the corrected count of each prospective point to the number of the prospective points included in the overall image as counted on the corrected count of each prospective point, an area the probability of which that the area is a real micro calcification shadow is stronger can be extracted as a prospective micro calcification shadow.

Further even if noises and the like are included in the prospective points, circular areas including noises and the like are separated from those including a micro calcification shadow. Accordingly, the threshold values T1 and T2 used in extraction of the prospective points may be lower so that the prospective micro calcification image Cs includes more noises and the like, whereby thin micro calcification shadows which have conventionally been removed together with noises can be extracted and the micro calcification detecting efficiency can be improved.

The specific values of count-correcting values and/or the method of setting the values described above are only by way of example and may be variously changed according to the feature and/or the like of the micro calcification shadow to be detected.

Though, in the embodiments described above, the value of count of each of the prospective points and the number of the prospective points in each of the circular areas are corrected on the basis of both the deviations in density and size, they may be corrected on the basis of only one of the deviations in density and size.

Further, though in the embodiments described above, the prospective area extracting means is arranged to extract prospective areas on the basis of the prospective micro calcification image data Cs input from the prospective point extracting means, the prospective area extracting means may be in the various forms. For example, the prospective area extracting means may be arranged to extract an prospective areas those which are high in brightness in the original image.

What is claimed is:

1. An abnormal shadow detecting system comprising:
   a characteristic value calculating means which calculates a characteristic value on the shape and/or the density of a prospective area of a micro calcification shadow set in an image of an object on the basis of image data representing the image of the object, wherein the characteristic value comprises at least one of
   a first threshold value at the time at which the number of prospective points of micro calcification extracted from the prospective area reaches a predetermined number,
   the difference between the first threshold value and a second threshold value at the time at which a first prospective point is extracted,
   the total volume of the predetermined number of prospective points extracted by the use of the first threshold value,
   the dispersion in size of the predetermined number of prospective points extracted by the use of the first threshold value,
   the dispersion in density of the predetermined number of prospective points extracted by the use of the first threshold value,
   the sum-square of the high frequency component signals of the part of the image of the object after subjected to FFT corresponding to a central region of the prospective areas,
   a first frequency at which one-dimensional response in the frequency space after the FFT becomes not larger than a predetermined value for the first time,
   the coefficient of variation of the dispersion in lengths in a plurality of directions of the prospective point at the center of the prospective area from its center of gravity, and
   the maximum length of the prospective point at the center of the prospective area; and
   a discriminating means which discriminates whether a micro calcification shadow really exists in the prospective area on the basis of the calculated characteristic value.

2. An abnormal shadow detecting system comprising:
   a characteristic value calculating means which calculates a characteristic value on the shape and/or the density of a prospective area of a micro calcification shadow set in an image of an object on the basis of image data representing the image of the object; and
   a discriminating means which discriminates whether a micro calcification shadow really exists in the prospective area on the basis of the calculated characteristic value, wherein the prospective area includes a common micro calcification shadow, which is high in density, and an isolated micro calcification shadow, which is low in density and the discriminating means is arranged to discriminate whether a micro calcification shadow really exists in the prospective area on the basis of different criteria for discriminating between when the prospective area is of common micro calcification, which is high in density, and when the prospective area is of isolated micro calcification, which is low in density.

3. An abnormal shadow detecting system comprising:
   a prospective point extracting means which extracts a plurality of prospective points representing a prospective micro calcification shadow in an image of a breast on the basis of image data representing the image of the breast,
   a prospective area detecting means which detects a prospective micro calcification area including extracted prospective points on the basis of the image data,
   a corrected count calculating means which calculates a corrected count of each of the extracted prospective points for counting the number of the extracted prospective points differently weighting the extracted prospective points on the basis of dispersion in size and/or density of all the prospective points in a predetermined area including the extracted prospective point, and
   a discriminating means which calculates the proportion of the number of the prospective points included in a prospective area as counted on the corrected count of each prospective point to the number of the prospective points included in the overall image as counted on the corrected count of each prospective point and discriminates whether a micro calcification shadow really exists in the prospective area on the basis of the proportion.

4. An abnormal shadow detecting system as defined in claim 3 in which the corrected count for each prospective point is larger as the dispersion in size and/or density of all the prospective points in a predetermined area including the prospective point increases, and smaller as the dispersion in size and/or density decreases, and the discriminating means is arranged to determine that a micro calcification shadow really exists in the prospective area when the proportion is not smaller than a predetermined value.

5. An abnormal shadow detecting system as defined in claim 1 in which the prospective area includes a common micro calcification shadow, which is high in density, and an isolated micro calcification shadow, which is low in density and the discriminating means is arranged to discriminate whether a micro calcification shadow really exists in the prospective area on the basis of different criteria for discriminating between when the prospective area is of common micro calcification, which is high in density, and when the prospective area is of isolated micro calcification, which is low in density.

6. An abnormal shadow detecting system as defined in claim 2 in which the discriminating means discriminates on the basis of the likelihood ratio based on Mahalanobis distances.

7. An abnormal shadow detecting system as defined in claim 2 wherein the discriminating means discriminates by the use of a neural network.

8. An abnormal shadow detecting system comprising:

a characteristic value calculating means which calculates a plurality of characteristic values on the shape and/or the density of a prospective area of a micro calcification shadow set in an image of an object on the basis of image data representing the image of the object, and a discriminating means which discriminates whether a micro calcification shadow really exists in the prospective area on the basis of the plurality of calculated characteristic values, wherein the plurality of characteristic values comprises more than one of a first threshold value at the time at which the number of prospective points of micro calcification extracted from the prospective area reaches a predetermined number, the difference between the first threshold value and a second threshold value at the time at which a first prospective point is extracted, the total volume of the predetermined number of prospective points extracted by the use of the first threshold value, the dispersion in size of the predetermined number of prospective points extracted by the use of the first threshold value, the dispersion in density of the predetermined number of prospective points extracted by the use of the first threshold value, the sum-square of the high frequency component signals of the part of the image of the object after subjected to FFT corresponding to a central region of the prospective areas, a first frequency at which one-dimensional response in the frequency space after the FFT becomes not larger than a predetermined value for the first time, the coefficient of variation of the dispersion in lengths in a plurality of directions of the prospective point at the center of the prospective area from its center of gravity, and the maximum length of the prospective point at the center of the prospective area.

9. An abnormal shadow detecting system comprising:

a characteristic value calculating means which calculates a characteristic value on the shave and/or the density of a prospective area of a micro calcification shadow set in an image of an object on the basis of image data representing the image of the object, and a discriminating means which discriminates whether a micro calcification shadow really exists in the prospective area on the basis of the calculated characteristic value, wherein the prospective area includes a common micro calcification shadow, which is high in density, and an isolated micro calcification shadow, which is low in density and the discriminating means is arranged to discriminate whether a micro calcification shadow really exists in the prospective area on the basis of different criteria for discriminating between when the prospective area is of common micro calcification, which is high in density, and when the prospective area is of isolated micro calcification, which is low in density.

10. An abnormal shadow detecting system as defined in claim 9 in which the discriminating means discriminates on the basis of the likelihood ratio based on Mahalanobis distances.

11. An abnormal shadow detecting system as defined in claim 9 wherein the discriminating means discriminates by the use of a neural network.

12. An abnormal shadow detecting system comprising:

a characteristic value calculating means which calculates a plurality of characteristic values on the shape and/or the density of a prospective area of a micro calcification shadow set in an image of an object on the basis of image data representing the image of the object, and a discriminating means which discriminates whether a micro calcification shadow really exists in the prospective area on the basis of the plurality of calculated characteristic values, wherein the characteristic value calculating means differently weights the plurality of characteristic values on the basis of dispersion in size and/or density of prospective points in a predetermined area including the prospective points.

* * * * *